US012764065B2

(12) United States Patent
Semwal et al.

(10) Patent No.: US 12,764,065 B2
(45) Date of Patent: Oct. 13, 2026

(54) AVOIDING TRAFFIC BLACKHOLING IN AN EVPN DCI NETWORK TOPOLOGY CAUSED BY EVPN ALIASING

(71) Applicant: Arista Networks, Inc., Santa Clara, CA (US)

(72) Inventors: Rajesh Semwal, San Ramon, CA (US); Omar Jamil, Austin, TX (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 69 days.

(21) Appl. No.: 18/821,317

(22) Filed: Aug. 30, 2024

(65) Prior Publication Data

US 2026/0067208 A1 Mar. 5, 2026

(51) Int. Cl.

| | |
|---|---|
| ***H04L 45/00*** | (2022.01) |
| ***H04L 12/46*** | (2006.01) |
| ***H04L 45/76*** | (2022.01) |

(52) U.S. Cl.

CPC .......... *H04L 45/66* (2013.01); *H04L 12/4641* (2013.01); *H04L 45/76* (2022.05)

(58) Field of Classification Search

CPC ...... H04L 45/66; H04L 45/76; H04L 12/4641

USPC .......................................................... 709/238

See application file for complete search history.

(56) References Cited

U.S. PATENT DOCUMENTS

| | | | | |
|---|---|---|---|---|
| 9,628,409 | B1 * | 4/2017 | Yuvaraj | H04L 49/201 |
| 9,860,150 | B2 * | 1/2018 | Singh | H04L 43/0817 |
| 11,057,243 | B2 * | 7/2021 | Bickhart | H04L 12/4633 |
| 12,368,613 | B1 * | 7/2025 | Lin | H04L 45/66 |
| 2016/0134528 | A1 * | 5/2016 | Lin | H04L 12/4641 709/238 |

OTHER PUBLICATIONS

Nokia, 7210 Service Access System, Sep. 2022, https://documentation.nokia.com/cgi-bin/dbaccessfilename.cgi/3HE18214AAABTQZZA01_V1_7210%20SAS-R6%20R12%20Services%20Guide%2022.9.R1.pdf (Year: 2022).*

* cited by examiner

*Primary Examiner* — Zi Ye

(74) *Attorney, Agent, or Firm* — Fountainhead Law Group, PC

(57) ABSTRACT

Techniques for avoiding traffic blackholing problems in an Ethernet Virtual Private Network (EVPN) Data Center Interconnect (DCI) network topology that are caused by EVPN aliasing are provided. In one set of embodiments, a gateway device in the EVPN DCI network topology can determine whether an Ethernet Segment (ES) to which the gateway device is connected is an Interconnect ES (I-ES). If so, the gateway device can advertise an Auto-Discovery (AD) per ES route for the ES to one or more other network elements in the EVPN DCI network topology, without advertising any AD per EVPN Instance (EVI) routes for the ES.

20 Claims, 6 Drawing Sheets

AVOIDING TRAFFIC BLACKHOLING IN AN EVPN DCI NETWORK TOPOLOGY CAUSED BY EVPN ALIASING

BACKGROUND

Ethernet Virtual Private Network (EVPN) is a network control plane mechanism that uses Border Gateway Protocol (BGP) to advertise Layer 2 (L2) and Layer 3 (L3) reachability information (e.g., Media Access Control (MAC) addresses, Internet Protocol (IP) prefixes, and MAC/IP bindings). EVPN is commonly deployed in data centers, in conjunction with an overlay technology such as Virtual Extensible Local Area Network (VXLAN), to create logical L2 overlay networks over a physical L3 underlay network. This provides various benefits such as improved network scalability and efficiency, workload mobility, support for multi-tenancy and network segmentation, high availability, and so on.

EVPN Data Center Interconnect (DCI) is an extension of EVPN that enables the exchange of L2/L3 reachability information across multiple, geographically dispersed data centers over a wide area network (WAN). In an EVPN DCI network topology, a data center may be connected to the WAN (and thus, to other data centers) via multiple physical links, collectively referred to as an Interconnect Ethernet Segment (I-ES). The use of an I-ES provides redundancy for inter-data center communications but can result in blackholing (or in other words, inadvertent dropping) of L2 traffic under certain conditions.

BRIEF DESCRIPTION OF THE DRAWINGS

With respect to the discussion to follow and in particular to the drawings, it is stressed that the particulars shown represent examples for purposes of illustrative discussion and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

In the following description, for purposes of explanation, numerous examples and details are set forth in order to provide an understanding of embodiments of the present disclosure. Particular embodiments as expressed in the claims may include some or all of the features in these examples, alone or in combination with other features described below, and may further include modifications and equivalents of the features and concepts described herein.

Figure 1:
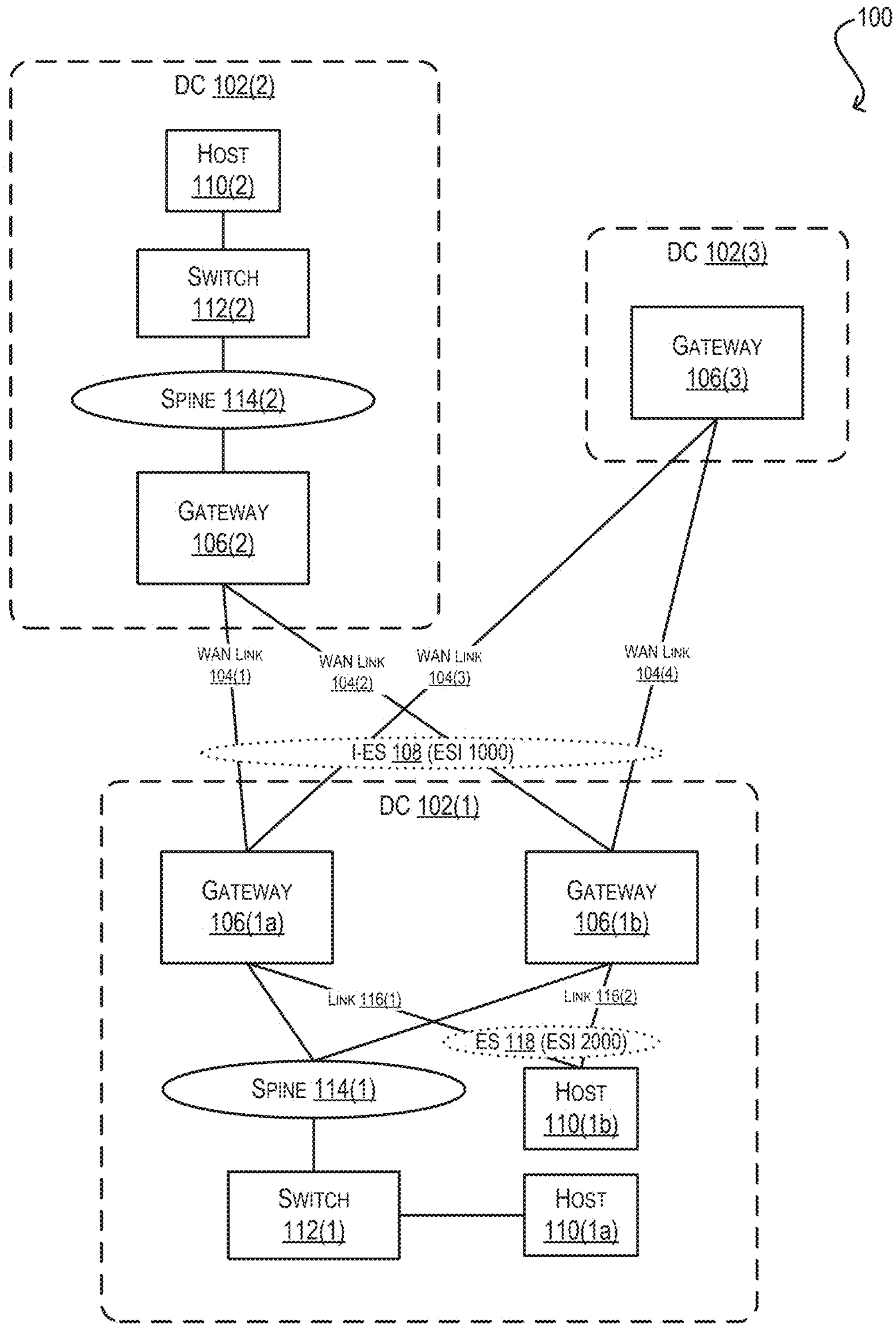
FIG. 1 depicts an example EVPN DCI network topology.

Embodiments of the present disclosure are directed to techniques for avoiding traffic blackholing in an EVPN DCI topology that uses an I-ES. In particular, these techniques address L2 traffic blackholing problems that may arise due to an EVPN feature known as EVPN aliasing, which is explained below. 1. Example Topology and Problem Context FIG. 1 is a simplified block diagram of an example EVPN DCI network topology 100 in which the techniques of the present disclosure may be implemented. As shown, topology 100 includes three data center networks (referred to as simply DCs) 102(1)-(3) that are interconnected via four WAN links: a first WAN link 104(1) between a gateway 106(1*a*) of DC 102(1) and a gateway 106(2) of DC 102(2), a second WAN link 104(2) between a gateway 106(1*b*) of DC 102(1) and gateway 106(2) of DC 102(2), a third WAN link 104(3) between gateway 106(1*a*) of DC 102(1) and a gateway 106(3) of DC 102(3), and a fourth WAN link 104(4) between gateway 106(1*b*) of DC 102(1) and gateway 106(3) of DC 102(3).

WAN links 104(1)-(4) collectively form an I-ES 108 for DC 102(1) that is identified by an Ethernet Segment Identifier (ESI) (1000 in this example). An Ethernet Segment (ES) is a collection of links that connect one or more network elements (e.g., switches, routers, hosts, etc.) to a common network segment. An I-ES is a particular type of ES that connects multiple network elements across different data centers. In FIG. 1, I-ES 108 is connected to two redundant gateways in DC 102(1), namely gateways 106(1*a*) and 106(1*b*). This allows network elements in DC 102(1) to be multihomed to the remote network domain/segment embodied by I-ES 108 and also allows network elements in remote DCs 102(2) and 102(3) (e.g., gateways 106(2) and 106(3)) to be multihomed to the network elements in DC 102(1).

Beyond gateways 106(1*a*) and 106(1*b*), DC 102(1) includes a host 110(1*a*) that is connected to a network switch 112(1), which is in turn connected to gateways 106(1*a*) and 106(1*b*) via a spine fabric 114(1). Switch 112(1) may be, e.g., a VXLAN Tunnel Endpoint (VTEP) in the scenario where DC 102(1) employs an EVPN-VXLAN architecture for establishing L2 overlay networks. Similarly, DC 102(2) includes a host 110(2) that is connected to a network switch 112(2), which is in turn connected to gateway 106(2) via a spine fabric 114(2).

DC 102(1) also includes a second host 110(1*b*) that is directly connected to gateways 106(1*a*) and 106(1*b*) via links 116(1) and 116(2). These links collectively form a (regular) ES 118 that is identified by the example ESI 2000.

1.1 Example Gateway

Figure 2:
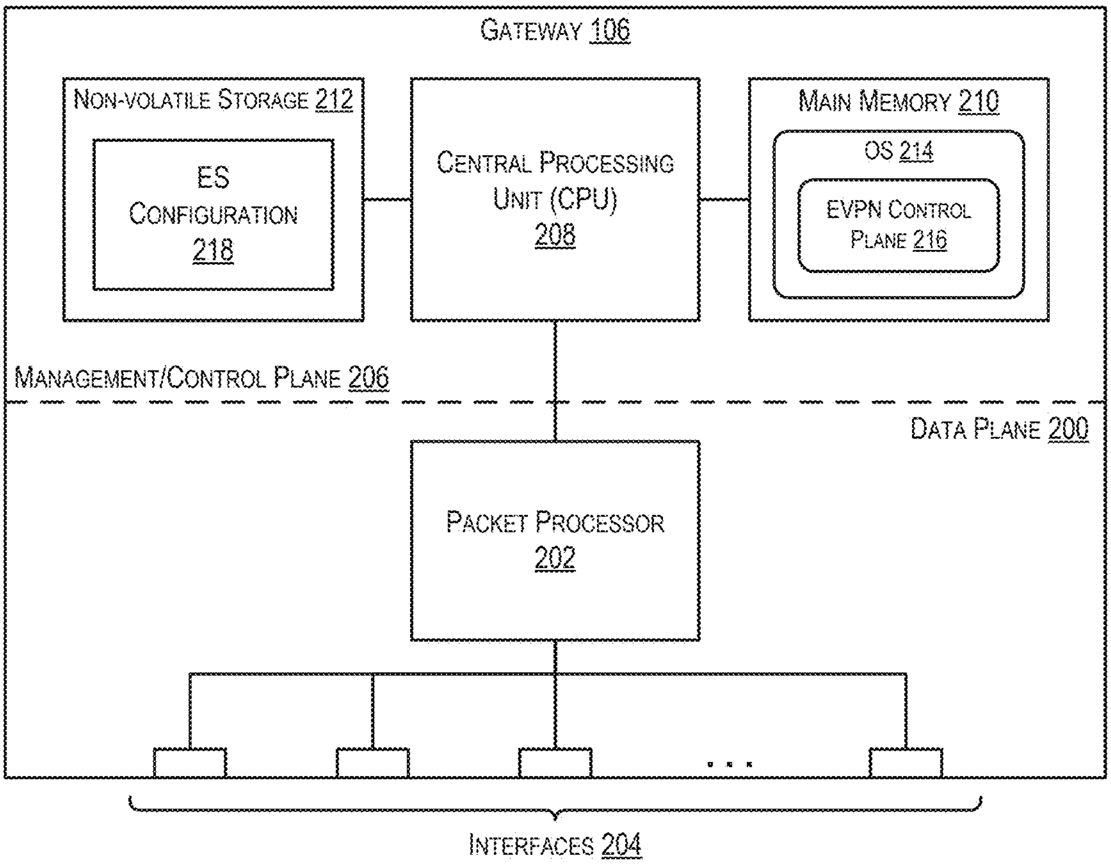
FIG. 2 depicts an example gateway.

FIG. 2 is a simplified block diagram of each gateway 106 of topology 100 according to certain embodiments. As shown in FIG. 2, gateway 106 includes a data (or forwarding) plane 200 comprising a packet processor 202 and a set of front-panel interfaces (ports) 204. Packet processor 202 is an integrated circuit, such as an application-specific integrated circuit (ASIC) or field-programmable gate array (FPGA), that is responsible for performing line-speed processing of network packets (i.e., traffic) that pass through gateway 106 via interfaces 204. This line-speed processing can include, for example, the forwarding of L2 traffic and the routing of L3 traffic.

Gateway 106 also includes a management/control plane 206 comprising a central processing unit (CPU) 208, a main memory 210, and a non-volatile (e.g., flash) storage 212.

CPU 208 is a general-purpose processor that is responsible for managing the configuration/operation of gateway 106 and controlling the device's understanding of the network in which it resides. CPU 208 carries out these functions under the direction of an operating system (OS) 214 that runs on CPU 208 from main memory 210.

Because gateway 106 is an EVPN-enabled network device, OS 214 includes EVPN/BGP control plane software (hereinafter simply EVPN control plane) 216 that allows gateway 106 to communicate with other EVPN peers via the BGP protocol. In addition, gateway 106 maintains on non-volatile storage 212 an ES configuration 218 that identifies all of the ESs to which the gateway is connected. This ES configuration is typically specified/created by a user or administrator of gateway 106. As described in the next section, gateway 106 uses ES configuration 218 to advertise reachability information regarding its connected ESs to other network elements in the same EVPN domain.

By way of example, the following table depicts sample entries that may be stored in the ES configuration of gateways 106(1*a*) and 106(1*b*) of FIG. 1. As shown, each entry identifies the ESI of an ES to which the gateway is connected and an indication of whether that ES is an I-ES or a regular ES. It should be appreciated that these entries are illustrative and may be formatted differently and/or include additional attributes in different gateway implementations.

TABLE 1

| ESI | Type |
|---|---|
| 1000 | I-ES |
| 2000 | ES |

1.2 Advertisement of EVPN Routes and ECMP Forwarding

Gateways 106(1*a*), 106(1*b*), 106(2), and 106(3) are generally responsible for facilitating communication within their respective local DCs and between those local DCs and remotely-connected DCs. These responsibilities include advertising L2/L3 reachability information in the form of EVPN routes, which is important for enabling EVPN functionalities such as MAC/IP address learning.

One type of EVPN route that is advertised by the gateways is known as Auto-Discovery (AD), or Type-1, routes. These AD routes are advertised for each ES configured on the gateway (per its ES configuration 218) and includes two sub-types: an "AD per ES" route that indicates connectivity between the gateway (i.e., advertiser) and the ES and one or more "AD per EVI" routes that contain information for reaching the ES via the gateway (one per EVI (EVPN instance)). The reachability information in an AD per EVI route comprises, among other things, the ESI of the ES, a Multi-Protocol Label Switching (MPLS) label or VXLAN network identifier (VNI) associated with the route, and the IP address of the gateway (as the next hop for reaching the ES).

For example, because gateways 106(1*a*) and 106(1*b*) of DC 102(1) have two ESs defined in their ES configurations (i.e., I-ES 108 and ES 118), these gateways will advertise AD routes for each of these ESs to other network elements in DC 102(1), including to switch 112(1). This will cause switch 112(1) to receive two sets of AD routes for each ES—one from gateway 106(1*a*) and another from gateway 106(1*b*)).

Another type of EVPN route that is advertised by the gateways is known as MAC/IP, or Type-2, routes. These MAC/IP routes are advertised for each endpoint device (e.g., host) that the gateway has received MAC information for and comprises, among other things, the MAC address (and optionally, IP address) of the endpoint, the ESI of the ES to which the endpoint belongs (or in other words, is connected to), an associated MPLS label or VNI, and the IP address of the gateway (as the next hop for reaching the endpoint).

For instance, consider a scenario in which gateway 106(2) of DC 102(2) learns the MAC address of host 110(2). In this scenario, gateway 106(2) will advertise a MAC/IP route for host 110(2) to gateways 106(1*a*) and 106(1*b*) of DC 102(1) over WAN links 104(1) and 104(2) respectively. Note that gateway 106(2) will always send this and other MAC/IP routes over both of these links, because they represent a single logical path to DC 102(1).

In response, each gateway 106(1*a*)/(1*b*) will update its forwarding table with the received route and generate a new MAC/IP route for host 110(2) that specifies I-ES 108 (ESI 1000) as the ES to which this host belongs (because the original MAC/IP route for the host was received from a link in I-ES 108). The gateway will then advertise the newly-generated MAC/IP route to other network elements they are connected to, including for example switch 112(1) of DC 102(1).

It should be noted that, upon receiving a MAC/IP route for host 110(2) from each of gateways 106(1*a*) and 106(1*b*) respectively, switch 112(1) will know that it has two possible paths for reaching host 110(2)—one through gateway 106 (1*a*) and another through gateway 106(1*b*). Accordingly, switch 112(1) will set up Equal-Cost Multi-Path (ECMP) forwarding for load balancing L2 traffic destined for host 110(2) across these two gateways. More specifically, switch 112(1) will create an ECMP group that includes gateways 106(1*a*) and 106(1*b*) as members and set this ECMP group as the next hop for L2 packets destined for the MAC address of host 110(2). This allows switch 112(1) to load balance such L2 packets across gateways 106(1*a*) and 106(1*b*) by hashing the header of each packet and sending the packet to one of the two gateways based on the computed hash.

1.3 EVPN Aliasing

EVPN aliasing is an EVPN feature that enables a network element to load balance L2 traffic destined for an endpoint across multiple paths to an ES of the endpoint, in the case where the network element has not received explicit MAC/IP routes for the endpoint with respect to each of those paths. To understand how EVPN aliasing works in practice, consider host 110(1*b*) of DC 102(1), which is directly connected to gateways 106(1*a*) and 106(1*b*) via ES 118. In this type of configuration, host 110(1*b*) will typically send outgoing traffic to only one of the two gateways, which means that only a single gateway (say, 106(1*a*)) will learn the MAC address of host 110(1*b*) and advertise a MAC/IP route for it to other connected network elements, including to switch 112(1). Hence, switch 112(1) will only be aware of a single path to host 110(1*b*) through gateway 106(1*a*), despite the fact that there are two paths (one through gateway 106(1*a*) and another through gateway 106(1*b*)).

However, recall from above that gateway 106(1*b*) advertises a set of AD routes for ES 118 to switch 112(1), which includes an AD per EVI route for reaching ES 118 through gateway 106(1*b*). Upon receiving this AD per EVI route from gateway 106(1*b*) and the MAC/IP route for host 110(1*b*) from gateway 106(1*a*), switch 112(1) will infer, via the EVPN aliasing mechanism, that it can reach host 110(1*b*) through gateway 106(1*b*), because it knows that host 110 (1*b*) belongs to ES 118 per the received MAC/IP route and that ES 118 is reachable via gateway 106(1*b*) per the received AD per EVI route. Accordingly, switch 112(1) will proceed with performing ECMP forwarding of L2 traffic destined for host 110(1*b*) across gateways 106(1*a*) and 106(1*b*), despite never receiving an explicit MAC/IP route for this host from gateway 106(1*b*). This is useful as it enables switch 112(1) to utilize all available links for reaching host 110(*b*), leading to better redundancy and improved network efficiency.

2. First Problem: WAN Connection Loss

Figure 3:
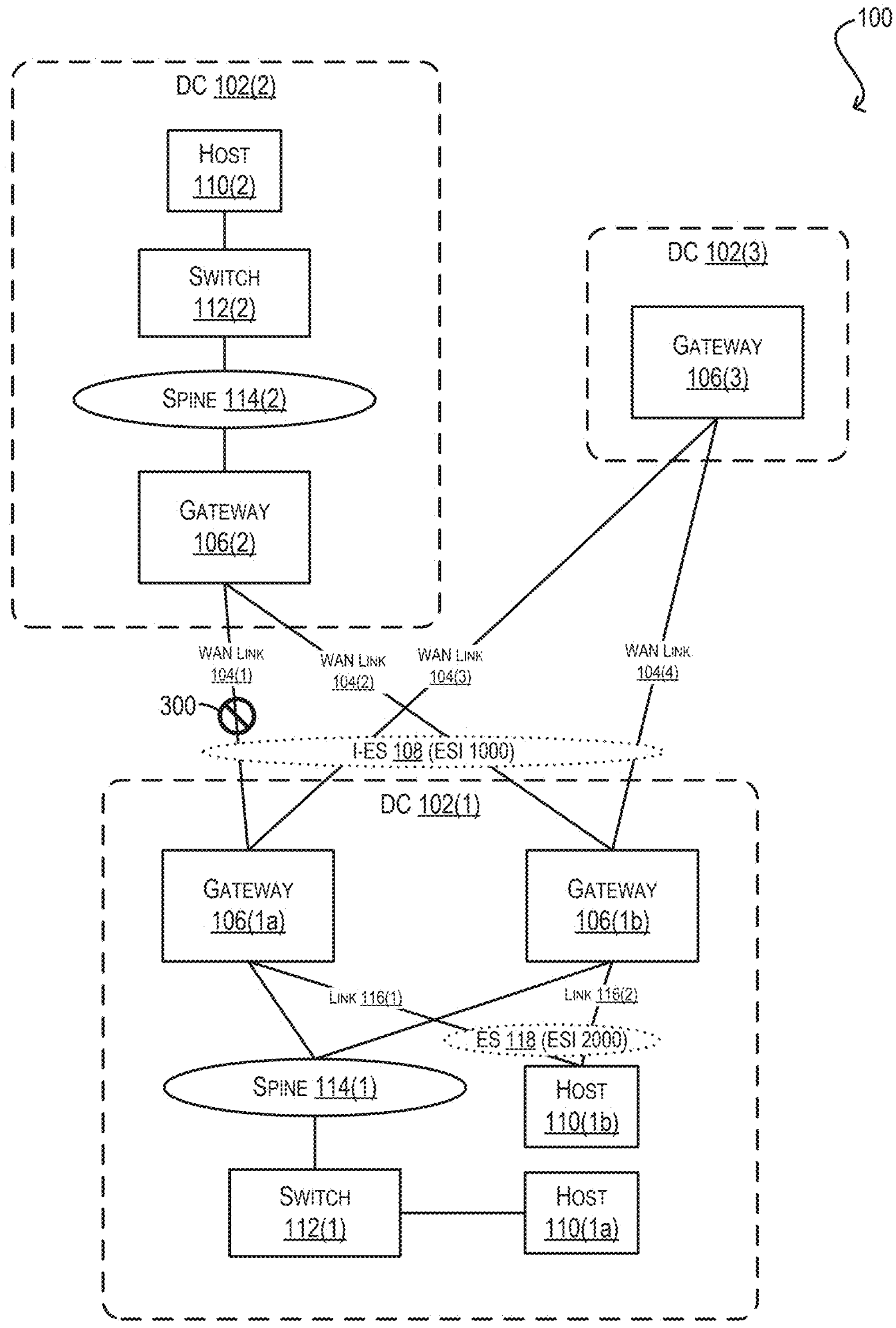
FIG. 3 depicts a WAN connection loss scenario in the EVPN DCI network topology of FIG. 1.

With the foregoing context in mind, two types of L2 traffic blackholing problems can arise in topology 100 of FIG. 1. The first problem pertains to a scenario depicted in FIG. 3 where WAN link 104(1) between gateways 106(1*a*) of DC 102(1) and gateway 106(2) of DC 102(2) goes down. Assume this WAN connection loss (shown via reference numeral 300) occurs after redundant gateways 106(1*a*) and 106(1*b*) have received a MAC/IP route for host 110(2) from gateway 106(2) and have advertised this route to switch 112(1).

In this scenario, the EVPN/BGP session between gateways 106(1*a*) and 106(2) will be torn down, which will cause gateway 106(1*a*) to clean up all of the MAC/IP routes it previously received from gateway 106(2), including the route for host 110(2). As part of this cleanup process, gateway 106(1*a*) will withdraw the routes from switch 112(1), thereby causing switch 112(1) to only retain a single MAC/IP route for host 110(2) (namely, the route advertised by gateway 102(1*b*)).

However, as explained above, switch 112(1) will also have the AD routes for I-ES 108 advertised by gateway 106(1*b*), which includes an AD per EVI route comprising information for reaching I-ES 108 through gateway 106(1*a*). These AD routes are not withdrawn by gateway 106(1*a*) in response to the loss of WAN link 104(1) because I-ES 108 remains semi-operational; for example, gateway 106(1*a*) can still communicate with gateway 106(3) of DC 102(3) via WAN link 104(3) of I-ES 108. As a result, EVPN aliasing will cause switch 112(1) to set up ECMP forwarding of L2 traffic destined for host 110(2) across gateways 106(1*a*) and 106(1*b*), despite no longer having an explicit MAC/IP route for host 110(2) from gateway 106(1*a*). This in turn will cause gateway 106(1*a*) to receive L2 traffic destined for host 110(2) from switch 112(1) and immediately drop it, because the gateway cannot forward the traffic onward to gateway 106(2) of DC 102(2) over downed WAN link 104(1).

This problem is particularly serious because the blackholing of L2 traffic for host 110(2) at gateway 106(1*a*) will persist as long as WAN link 104(1) remains down, which can be an indefinite amount of time.

3. Second Problem: Gateway Reboot

Figure 4:
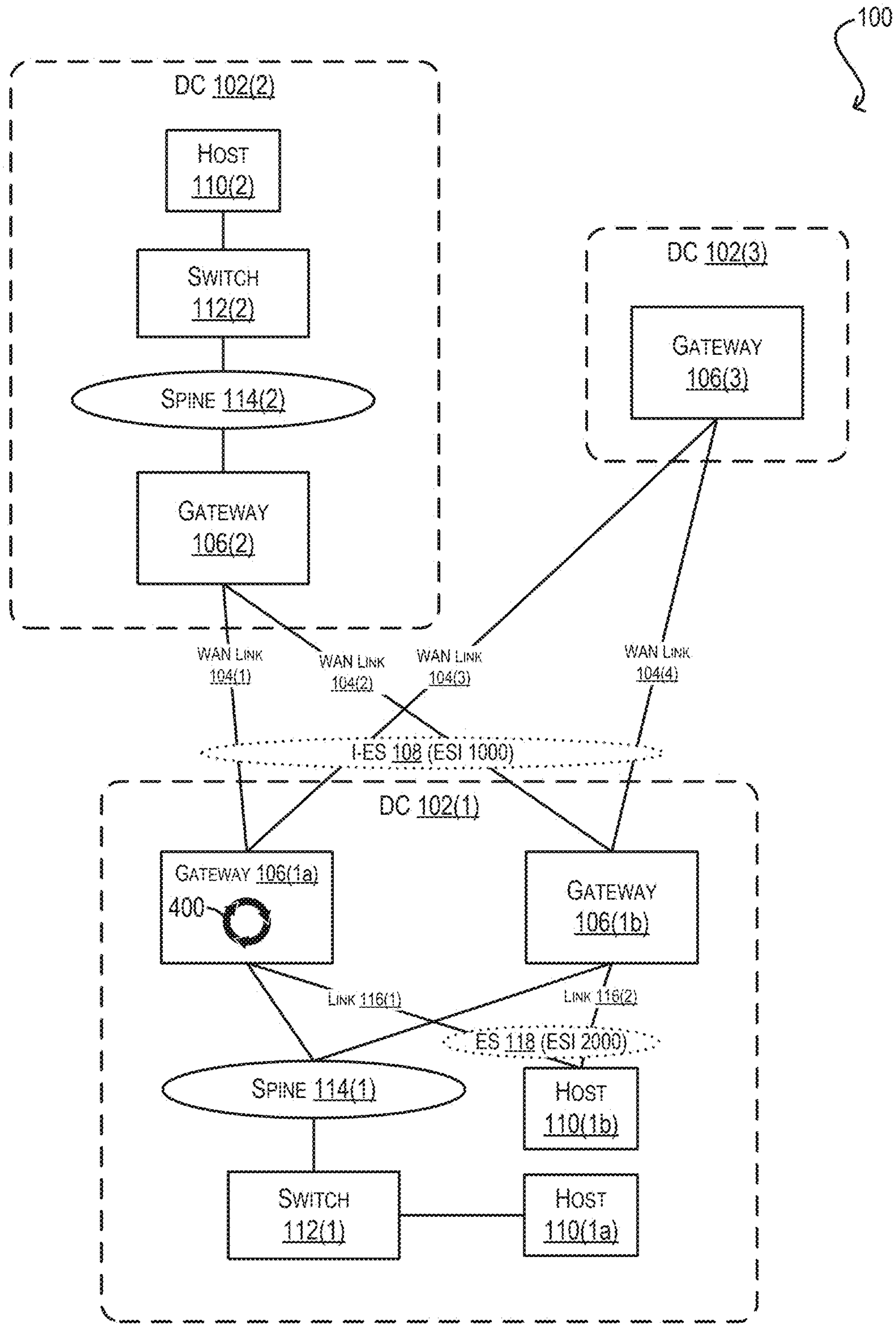
FIG. 4 depicts a gateway reboot scenario in the EVPN DCI network topology of FIG. 1.

The second problem pertains to a scenario depicted in FIG. 4 where gateway 106(1*a*) is rebooted due to planned maintenance or an unplanned event. Like the WAN connection loss scenario above, it is assumed that the reboot (shown via reference numeral 400) occurs after redundant gateways 106(1*a*) and 106(1*b*) have received a MAC/IP route for host 110(2) from gateway 106(2) and have advertised the route to switch 112(1).

In this scenario, at the time gateway 106(1*a*) goes offline due to being rebooted, switch 112(1) will delete the EVPN routes (both AD and MAC/IP routes) it previously received from gateway 106(1*a*). Further, as part of its bootup/initialization process, gateway 106(1*a*) will concurrently (1) attempt to re-establish EVPN/BGP sessions with its EVPN peers, including gateway 106(2) of DC 102(2) (thereby enabling gateway 106(1*a*) to receive MAC/IP routes from each of those peers), and (2) advertise AD routes for its configured ESs (i.e., I-ES 108 and ES 118) to other network elements in DC 102(1). Generally speaking, gateway 106(1*a*) will be able to advertise the AD routes without delay, because the advertisement process simply involves performing a lookup into its ES configuration 218 in order to identify the ESs identified there. This can lead to the following sequence of events:

1. Switch 112(1) receives the AD routes for I-ES 108 from gateway 106(1*a*), before it receives a MAC/IP route for host 110(2) from that gateway.
2. Per the EVPN aliasing mechanism, switch 112(1) infers that it can reach host 110(2) through gateway 106(1*a*) based on the AD per EVI routes received from gateway 106(1*a*) and an existing MAC/IP route for host 110(2) that it previously received from gateway 106(1*b*); accordingly, the switch begins performing ECMP forwarding of L2 traffic destined for host 110(2) across gateways 106(1*a*) and 106(1*b*).
3. Gateway 106(1*a*) receives L2 traffic destined for host 110(2) from switch 112(1), before it has received a MAC/IP route for host 110(2) from gateway 106(2) of DC 102(2).
4. Gateway 106(1*a*) drops the L2 traffic destined for host 110(2) because it does not know how to forward it.

This second problem is less severe than the first problem above because the traffic blackholing will only persist until gateway 106(1*a*) receives the MAC/IP route for host 110(2) from gateway 106(2), which may take several seconds or minutes at the most. At that point, gateway 106(1*a*) will learn the next hop for L2 traffic destined for host 110(2) (i.e., gateway 106(2)) and will be able to forward such traffic appropriately. However, this problem is still undesirable and should be avoided.

4. Solution Overview

Figure 5:
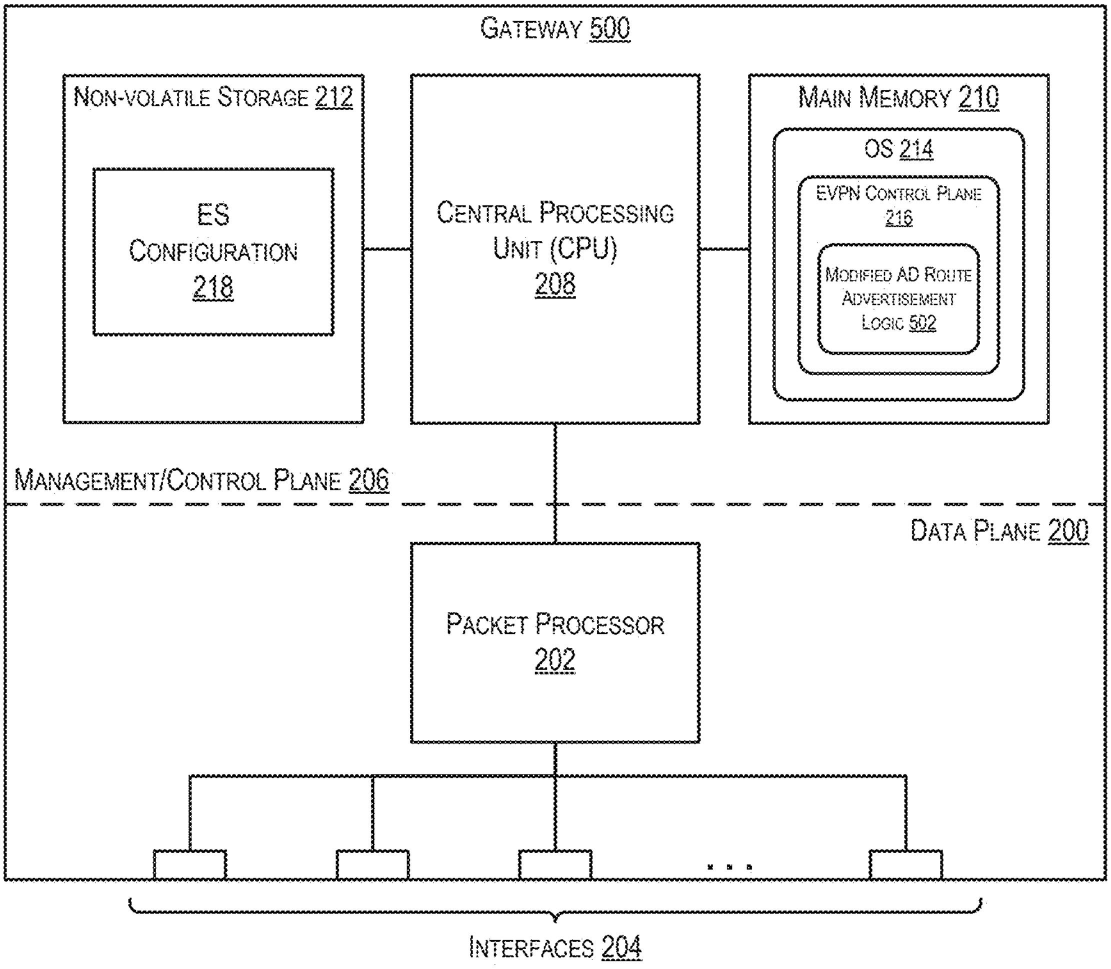
FIG. 5 depicts a gateway in accordance with certain embodiments of the present disclosure.

To address the foregoing and other similar/related problems, FIG. 5 depicts an enhanced version 500 of gateway 106 of FIG. 2 according to certain embodiments. As shown, gateway 500 includes modified AD route advertisement logic 502 in EVPN control plane 216.

At a high level, modified AD route advertisement logic 502 enables gateway 500 to prevent EVPN aliasing from taking effect with respect to I-ESs such as I-ES 108 of topology 100 by solely advertising AD per ES routes for the gateway's configured I-ESs (rather than advertising both AD per ES and AD per EVI routes). This approach effectively disables EVPN aliasing for such I-ESs because the reachability information included in the AD per EVI routes is needed to set up ECMP forwarding towards the I-ES at network elements such as switch 112(1). Accordingly, this approach avoids both of the traffic blackholing problems described in the preceding sections.

It should be noted that, in certain embodiments, modified AD route advertisement logic 502 continues to advertise AD per EVI routes (in addition to AD per ES routes) for regular ESs because there are valid aliasing use cases for such ESs. For example, as mentioned with respect to host 110(1*b*) of DC 102(1), this host will typically send out traffic to a single gateway 106(1*a*) or 106(1*b*), even though it is connected to both via ES 118. As a result, one of the two gateways (say 106(1*b*)) will never learn the MAC address of host 110(1*b*) and thus never advertise a MAC/IP route for this host. However, the link between host 110(1*b*) and gateway 106(1*b*) is operational and thus it would be desirable for other network elements in DC 102(1) to utilize this additional link via EVPN aliasing. By continuing to advertise AD per EVI routes for regular ESs like ES 118, the techniques of the present disclosure ensure that EVPN aliasing is still possible in this type of scenario.

In contrast, for an I-ES like I-ES 108, the only scenario in which one of the redundant gateways does not advertise a MAC/IP route for a remote host (while the other redundant gateway does so) is one in which the WAN link between that gateway and the remote DC has gone down. Accordingly, there is no use case in which EVPN aliasing with respect to an I-ES is useful.

Further, the solution of the present disclosure continues to advertise AD per ES routes for I-ESs because the advertisement of such routes allows for certain helpful features, such as performing a mass withdrawal of EVPN routes associated with an I-ES by sending out a single AD per ES route withdrawal.

It should be appreciated that FIGS. 1-5 and the foregoing high-level solution description are illustrative and not intended to limit embodiments of the present disclosure. For example, while the foregoing description focuses on I-ES 108, which is a "remote domain" I-ES comprising redundant links that interconnect the gateways of one DC to a WAN leading to other (remote) DCs, the solution described herein is also applicable to "local domain" I-ESs comprising redundant links that interconnect the gateways of a DC to other network elements within the same DC.

In addition, although FIGS. 1-5 depict a particular arrangement of components in topology 100 and gateway 106/500, other arrangements are possible (e.g., the functionality attributed to a particular component may be split into multiple components, components may be combined, etc.). One of ordinary skill in the art will recognize other similar modifications, variations, and alternatives.

5. AD Route Advertisement Workflow

Figure 6:
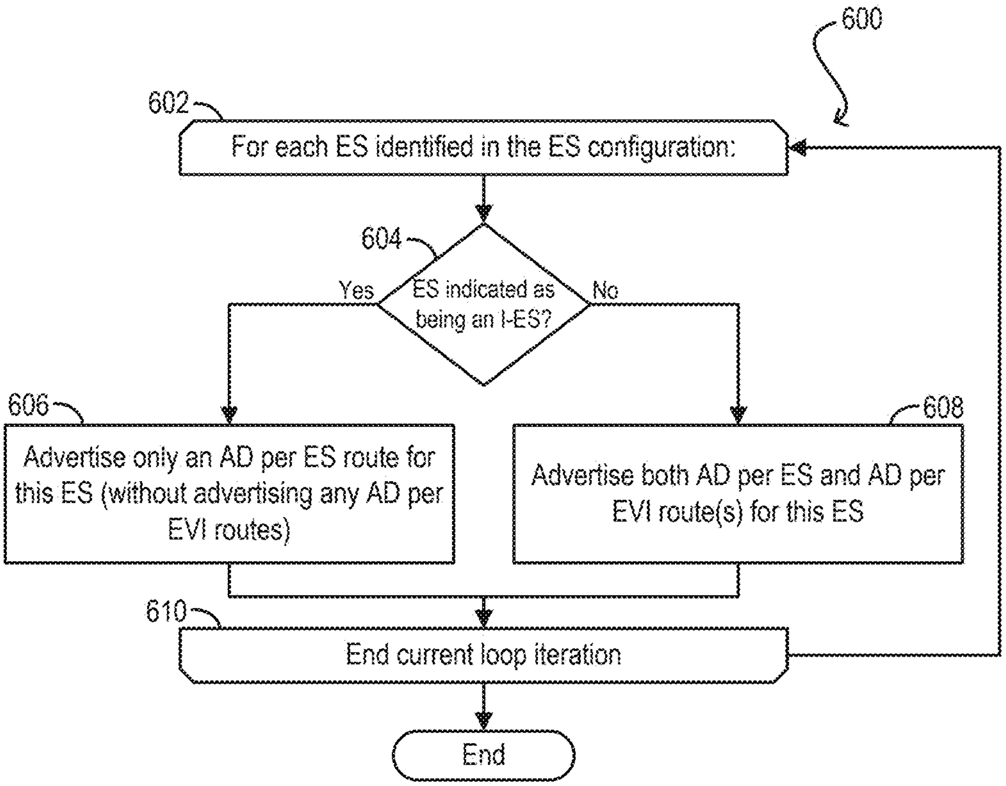
FIG. 6 depicts an AD route advertisement workflow in accordance with certain embodiments of the present disclosure.

FIG. 6 depicts a workflow 500 that may be performed by gateway 500 of FIG. 5 per modified AD route advertisement logic 502 for implementing the solution of the present disclosure according to certain embodiments. Gateway 500 can execute workflow 500 at the time of advertising AD routes for its configured ESs to EVPN peers.

Starting with step 602, gateway 500 can enter a loop for each ES identified in its ES configuration 218.

Within the loop, gateway 500 can determine whether the ES is indicated as being an I-ES in the configuration (step 604). If the answer is yes (i.e., the ES is an I-ES), gateway 500 can advertise only an AD per ES route for the ES to its EVPN peers (step 606). On the other hand, if the answer is no (i.e., the ES is not an I-ES), gateway 500 can advertise both an AD per ES route and AD per EVI route(s) to its EVPN peers (step 608).

At step 610, gateway 500 can reach the end of the current loop iteration and can return to the top of the loop in order to process the next ES in the configuration. Once all of the configured ESs have been processed, the workflow can end.

The above description illustrates various embodiments of the present disclosure along with examples of how aspects of these embodiments may be implemented. The above examples and embodiments should not be deemed to be the only embodiments and are presented to illustrate the flexibility and advantages of the present disclosure as defined by the following claims. For example, although certain embodiments have been described with respect to particular workflows and steps, it should be apparent to those skilled in the art that the scope of the present disclosure is not strictly limited to the described workflows and steps. Steps described as sequential may be executed in parallel, order of steps may be varied, and steps may be modified, combined, added, or omitted. As another example, although certain embodiments may have been described using a particular combination of hardware and software, it should be recognized that other combinations of hardware and software are possible, and that specific operations described as being implemented in hardware can also be implemented in software and vice versa.

The specification and drawings are, accordingly, to be regarded in an illustrative rather than restrictive sense. Other arrangements, embodiments, implementations, and equivalents will be evident to those skilled in the art and may be employed without departing from the spirit and scope of the present disclosure as set forth in the following claims.

The invention claimed is:

1. A method performed by a gateway device in an Ethernet Virtual Private Network (EVPN) Data Center Interconnect (DCI) network topology, the method comprising:
- for each of one or more Ethernet Segments (ESs) identified in a configuration of the gateway device:
  - determining whether the ES is indicated as being an Interconnect ES (I-ES) in the configuration; and
  - upon determining that the ES is indicated as being an I-ES in the configuration, advertising an Auto-Discovery (AD) per ES route for the ES to one or more other network elements in the EVPN DCI network topology, without advertising any AD per EVPN Instance (EVI) routes for the ES,
  - wherein advertising the AD per ES route without advertising any AD per EVI routes for the ES prevents EVPN aliasing from taking effect with respect to the ES,
  - wherein preventing EVPN aliasing from taking effect with respect to the ES avoids blackholing of Layer 2 (L2) traffic destined for an endpoint device belonging to the ES in a scenario where the gateway device cannot forward the L2 traffic.

2. The method of claim 1 wherein the AD per ES route indicates connectivity between the gateway device and the ES.

3. The method of claim 1 wherein each ES is a group of links that connect the gateway device and at least one other gateway device to a common network segment.

4. The method of claim 3 wherein the gateway device and the at least one other gateway device are part of a single data center network.

5. The method of claim 1 wherein the ES includes a wide area network (WAN) link between the gateway device and a remote gateway device and where the WAN link goes down so that the gateway device cannot forward the L2 traffic.

6. The method of claim 1 wherein the gateway device is rebooted so that the gateway cannot forward the L2 traffic.

7. The method of claim 1 further comprising:
- upon determining that the ES is not indicated as being an I-ES in the configuration, advertising both the AD per ES route for the ES and one or more AD per EVI routes for the ES to the one or more other network elements in the EVPN DCI network topology.

8. The method of claim 7 wherein each of the one or more AD per EVI routes includes a ES Identifier (ESI) of the ES, a Multi-Protocol Label Switching (MPLS) label or Virtual Extensible Local Area Network (VXLAN) network identifier, and an Internet Protocol (IP) address of the gateway device.

9. The method of claim 1 wherein the gateway device is part of a plurality of gateway devices within a first data center network of the EVPN DCI network topology, and wherein the ES is an I-ES comprising a plurality of links between the plurality of gateway devices and a WAN interconnecting the first data center network to one or more second data center networks.

10. The method of claim 1 wherein the gateway device is part of a plurality of gateway devices within a first data center network of the EVPN DCI network topology, and wherein the ES is an I-ES comprising a plurality of links between the plurality of gateway devices and a plurality of other network elements within the first data center network.

11. A network device in an Ethernet Virtual Private Network (EVPN) Data Center Interconnect (DCI) network topology, the network device comprising:

a central processing unit (CPU);

a non-volatile storage holding an Ethernet Segment (ES) configuration; and a main memory having stored thereon program code that, when executed by the CPU, causes the CPU to:

for each of one or more ESs identified in the ES configuration:

determining whether the ES is indicated as being an Interconnect ES (I-ES) in the ES configuration; and upon determining that the ES is indicated as being an I-ES in the ES configuration, advertising an Auto-Discovery (AD) per ES route for the ES to one or more other network elements in the EVPN DCI network topology, without advertising any AD per EVPN Instance (EVI) routes for the ES, wherein advertising the AD per ES route without advertising any AD per EVI routes for the ES prevents EVPN aliasing from taking effect with respect to the ES, wherein preventing EVPN aliasing from taking effect with respect to the ES avoids blackholing of Layer 2 (L2) traffic destined for an endpoint device belonging to the ES in a scenario where the network device cannot forward the L2 traffic.

12. The network device of claim 11 wherein the ES includes a wide area network (WAN) link between the network device and a remote network device and where the WAN link goes down so that the network device cannot forward the L2 traffic.

13. The network device of claim 11 wherein the network device is rebooted so that the network device cannot forward the L2 traffic.

14. The network device of claim 11 wherein the program code further causes the CPU to:

upon determining that the ES is not indicated as being an I-ES in the configuration, advertising both the AD per ES route for the ES and one or more AD per EVI routes for the ES to the one or more other network elements in the EVPN DCI network topology.

15. The network device of claim 14 wherein each of the one or more AD per EVI routes includes a ES Identifier (ESI) of the ES, a Multi-Protocol Label Switching (MPLS) label or Virtual Extensible Local Area Network (VXLAN) network identifier, and an Internet Protocol (IP) address of the network device.

16. The network device of claim 11 wherein the network device is part of a plurality of network devices within a first data center network of the EVPN DCI network topology, and wherein the ES is an I-ES comprising a plurality of links between the plurality of network devices and a WAN interconnecting the first data center network to one or more second data center networks.

17. The network device of claim 11 wherein the network device is part of a plurality of network devices within a first data center network of the EVPN DCI network topology, and wherein the ES is an I-ES comprising a plurality of links between the plurality of network devices and a plurality of other network elements within the first data center network.

18. A method performed by a gateway device in an Ethernet Virtual Private Network (EVPN) Data Center Interconnect (DCI) network topology, the method comprising:

determining whether an Ethernet Segment (ES) to which the gateway device is connected is an Interconnect ES (I-ES); and upon determining that the ES is an I-ES, advertising an Auto-Discovery (AD) per ES route for the ES to one or more other network elements in the EVPN DCI network topology, without advertising any AD per EVPN Instance (EVI) routes for the ES, wherein advertising the AD per ES route without advertising any AD per EVI routes for the ES prevents EVPN aliasing from taking effect with respect to the ES, wherein preventing EVPN aliasing from taking effect with respect to the ES avoids blackholing of Layer 2 (L2) traffic destined for an endpoint device belonging to the ES in a scenario where the gateway device cannot forward the L2 traffic.

19. The method of claim 18 wherein the ES includes a wide area network (WAN) link between the gateway device and a remote gateway device and where the WAN link goes down so that the gateway device cannot forward the L2 traffic.

20. The method of claim 18 wherein the gateway device is rebooted so that the gateway device cannot forward the L2 traffic.

* * * * *